Figure 3:
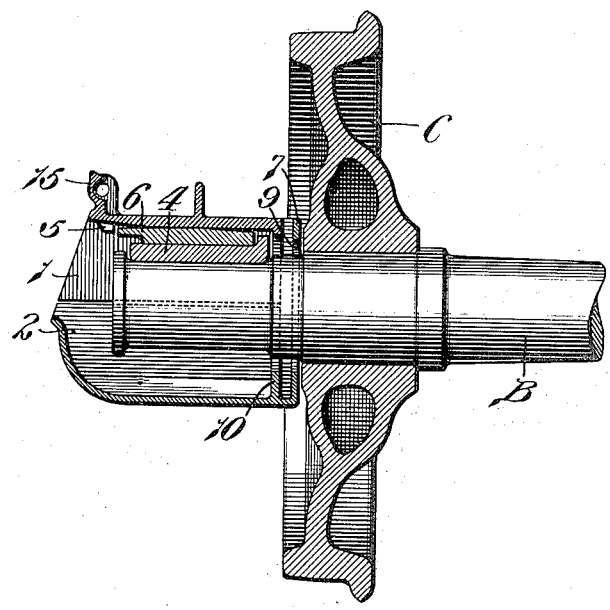

G. KOMAREK.
TRUCK SIDE FRAME.
APPLICATION FILED APR. 4, 1913.
1,068,668.
Patented July 29, 1913.
2 SHEETS—SHEET 1.
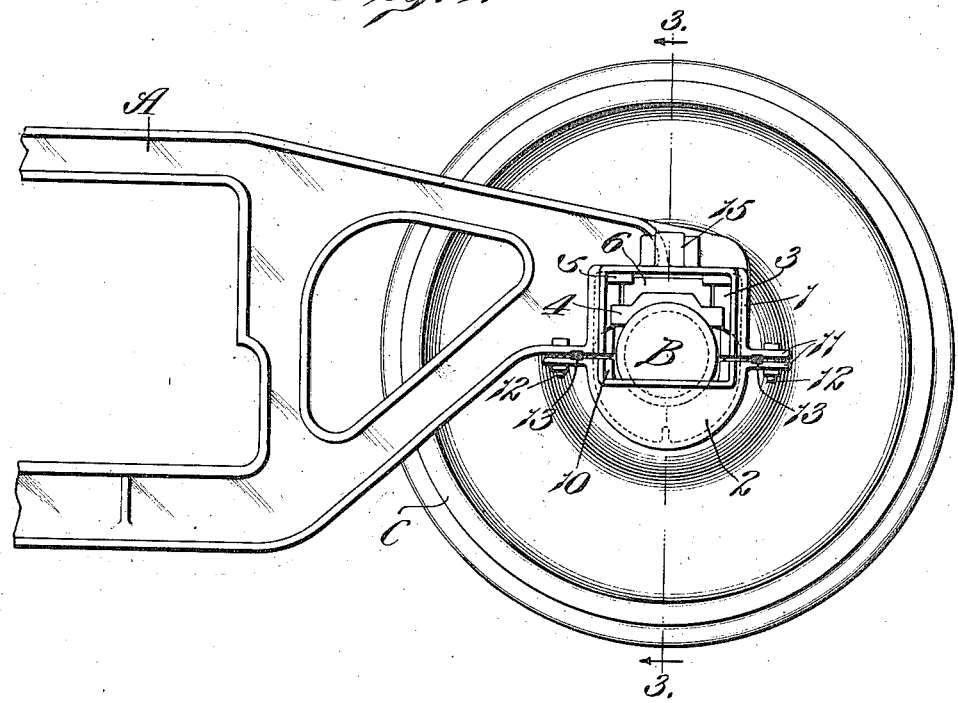
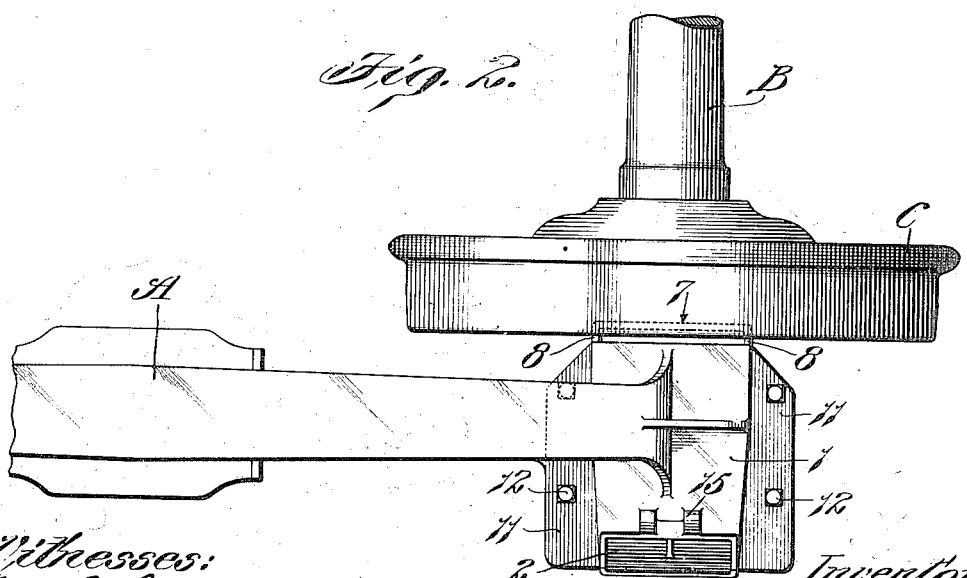

G. KOMAREK.
TRUCK SIDE FRAME.
APPLICATION FILED APR. 4, 1913.

1,068,668.

Patented July 29, 1913.

2 SHEETS—SHEET 2.

Witnesses:
Geo. R. Radson
M. Badger

Inventor,
Gustav Komarek.
By Bakewell & Cornwell Attys.

UNITED STATES PATENT OFFICE.

GUSTAV KOMAREK, OF ST. LOUIS, MISSOURI, ASSIGNOR TO CHARLES L. GILBERT, OF ST. LOUIS, MISSOURI.

TRUCK SIDE FRAME.

1,068,668.     Specification of Letters Patent.     Patented July 29, 1913.

Application filed April 4, 1913. Serial No. 758,958.

*To all whom it may concern:*

Be it known that I, GUSTAV KOMAREK, a citizen of the United States, residing at St. Louis, Missouri, have invented a certain new and useful Improvement in Truck Side Frames, of which the following is a full, clear, and exact description, such as will enable others skilled in the art to which it appertains to make and use the same.

This invention relates to truck side frames of the type in which the journal boxes are divided or formed in two parts, the upper half of each journal box usually being cast integral with the side frame and the lower half being removable so that the wheel axles can be removed without disconnecting the side frames from the other parts of the truck. In the side frames of this type which have heretofore been used commercially the stationary upper halves of the journal boxes are provided at their inner ends with integral dust guard guides which are located so close to the wheels of the truck that the rims of the wheels strike against same if the wheel axles are moved in a straight path out of the truck. In other words, the inner end portions of the upper halves of the journal boxes project slightly into the vertical plane in which the wheels lie. Consequently, a great deal of trouble is experienced in removing the wheel axles owing to the fact that it is necessary to turn the axles at an angle in order to cause the rims of the wheels to clear or pass the inner end portions of the stationary parts of the journal boxes.

The main object of my invention is to provide a truck side frame of novel construction that is equipped with divided journal boxes which are so designed that the wheel axles can be run out of the truck in a straight line or without twisting or turning the axles into an angular position in order to cause the rims of the wheels to clear or pass by the stationary parts of the journal boxes. I accomplish this desirable feature by forming the dust guard guides integral with the removable lower halves of the journal boxes and designing the stationary upper halves of the journal boxes so that they do not project into the vertical plane in which the wheels lie. Consequently, after the removable lower halves of the journal boxes have been disconnected from the stationary upper halves of the boxes the wheel axles can be run in a straight line out of the truck owing to the fact that the stationary portions of the journal boxes do not project into the plane of the wheels or lap under the edge portions of the wheel rims.

Another object is to provide a divided journal box side frame that is strong and serviceable and which can be manufactured at a low cost.

Figure 1 of the drawings is a side elevational view of a portion of a car truck side frame constructed in accordance with my invention; Fig. 2 is a top plan view of same; Fig. 3 is a transverse vertical sectional view taken on the line 3—3 of Fig. 1; and Fig. 4 is a perspective view of the removable lower portion of one of the journal boxes.

Referring to the drawings which illustrate the preferred form of my invention, A designates a car truck side frame in which each of the journal boxes is divided horizontally and is composed of a stationary upper portion 1 that is preferably formed integral with the side frame, and a removable lower portion 2 that is detachably connected to said upper portion 1, thereby enabling the side frames to be jacked up high enough to permit the wheel axle B to be run longitudinally out of the truck after the lower portions of the journal boxes on both side frames have been removed. The stationary upper part 1 of each journal box is provided with integral side lugs or stops 3 that coöperate with the usual lugs on the side of the journal bearing 4 and also with end stops 5 that coöperate with the journal bearing wedge 6 so that the upper portion of the journal box will receive all of the side shocks and end thrusts to which the journal bearing is subjected when in service.

Figure 4:
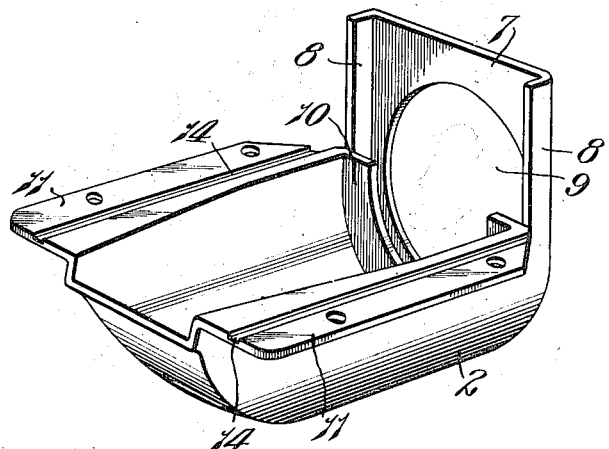

The removable lower portion 2 of the journal box is substantially semi-cylindrical-shaped in cross section as shown in Fig. 4, and it is provided at its inner end with an integral dust guard guide that is substantially channel-shaped in cross section, the vertically disposed web 7 of said guide projecting upwardly behind the stationary top portion 1 of the journal box so that it lies between the end of same and the wheel C, and the side flanges 8 of said guide projecting outwardly so that the edges of same will bear against the inner end of the stationary top part 1 of the journal box. The vertical web 7 of said dust guard guide has an enlarged opening 9 through which the journal of the axle passes, and when the two parts of the journal box are connected together a deep narrow pocket or guideway is provided at the inner end of the journal box for receiving the usual dust guard, not shown. The vertical web 7 and the side flanges 8 of the dust guard guide are formed integral with the lower portion 2 of the journal box, and said lower portion is also provided with an integral segmental-shaped flange 10 that lies parallel with the vertical web 7 of the dust guard guide and which is located in vertical alinement with the inner end wall of the stationary part 1 of the box, as shown in Fig. 3.

The removable lower portion 2 of the journal box can be retained in position in various ways without departing from the spirit of my invention. In the form of my invention herein shown the top and bottom portions of the box are provided with laterally projecting horizontally disposed flanges 11 through which bolts or other suitable fastening devices 12 pass so as to connect the removable lower part of the box to the stationary upper part 1, and, if desired, strips of felt or other suitable packing material 13 can be arranged in alining grooves 14 formed in the meeting faces of the flanges 11 so as to insure dust-tight joints between the removable and stationary parts of the journal box. A lid, not shown, is hinged or pivotally connected to a bracket 15 on the stationary top part 1 of the box so as to close the opening at the outer end of the box, said opening being formed partly in the removable lower portion 2 of the box and in the upper stationary part 1.

With a truck side frame of the construction above-described it is a very simple matter to remove the wheel axles from the side frames after the lower portions of the journal boxes have been disconnected in view of the fact that the stationary upper portions of the boxes that are formed integral with the side frames do not project into the vertical planes in which the wheels lie; or, stated in another way, the dust guard guides which normally lie in the vertical plane of the wheels, as shown in Figs. 2 and 3, are formed integral with the lower portions 2 of the journal boxes, and the stationary upper portions 1 of the journal boxes are so proportioned that the rims of the wheels will not strike against same when the wheel axles are moved longitudinally out of the truck. The lugs that coöperate with the journal bearings and with the journal bearing wedges are carried by the stationary upper portions of the journal boxes which are preferably formed integral with the side frames so that said integral upper portions receive all of the lateral thrusts and end thrusts to which the journal boxes are subjected when in service, thereby producing an exceptionally strong and serviceable side frame. The removable lower portions of the journal boxes are of simple design and construction, and as they merely form housings for the waste or lubricating medium that is supplied to the journals it is not necessary to machine or accurately fit the meeting faces of the removable and stationary parts of the journal box in view of the fact that the removable parts are not subjected to strains or thrusts. In practice, I prefer to form grooves in the meeting faces of the coöperating flanges on the stationary and removable part of each journal box so as to receive a suitable packing material and then connect said flanges together by means of bolts, but as previously stated, it is immaterial so far as my broad idea is concerned how the removable portions of the journal boxes are retained in position.

Having thus described my invention, what I claim as new and desire to secure by Letters Patent is:

1. A truck side frame provided with a divided journal box which consists of a stationary upper half formed integral with the side frame and a removable lower half that has an integral portion which projects upwardly over said stationary part so as to form a guide for the dust guard.

2. A truck side frame provided with a divided journal box which comprises a stationary upper half having two side walls that are formed integral with the side frame, and a removable lower half that carries the dust guard of the box, said stationary upper half being so proportioned that it does not project into the vertical plane in which the adjacent wheel of the truck lies.

3. A truck side frame provided with a divided journal box that comprises a stationary upper half formed integral with the side frame and having lugs that coöperate with the journal bearing and with the journal bearing wedge, a removable lower half detachably connected to said upper half, a substantially channel-shaped integral dust guard on said lower half that projects upwardly over the inner end of the upper half of the box, and an integral segmental-shaped flange in said lower half located in vertical alinement with the end wall of the stationary upper half of the box.

4. A truck side frame having a divided journal box comprising a stationary upper half formed integral with the side frame, a removable lower half provided with a dust guard guide that projects upwardly over the inner end of the stationary upper half of the box, laterally projecting flanges on the upper and lower halves of the box located at about the center of the box, and fastening devices passing through said flanges for retaining the lower half of the box in position.

5. A truck side frame having a divided journal box comprising a stationary upper half formed integral with the side frame, a removable lower half provided with a dust guard guide that projects upwardly over the inner end of the stationary top portion of the box, laterally projecting flanges on the lower edges of the side walls of the upper half of the box, coöperating laterally projecting flanges on the upper edges of the side walls of said lower half, fastening devices passing through said flanges for retaining the lower half of the box in position, and packing material interposed between said flanges so as to form tight joints between the two parts of the box.

In testimony whereof I hereunto affix my signature in the presence of two witnesses, this 29th day of March 1913.

GUSTAV KOMAREK.

Witnesses:
E. A. JUDGE,
WM. S. BRIDGEMAN.